Patented July 1, 1941

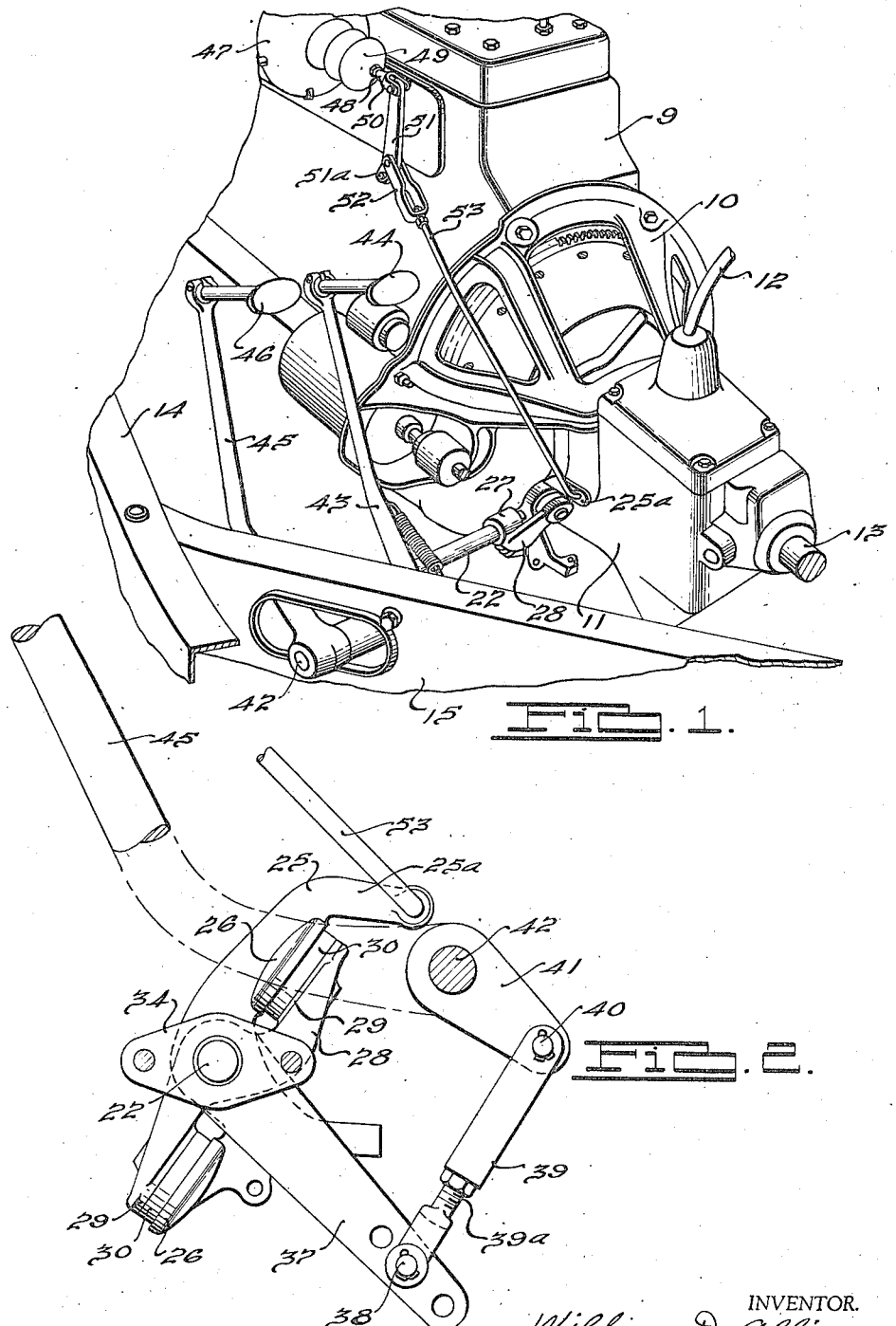

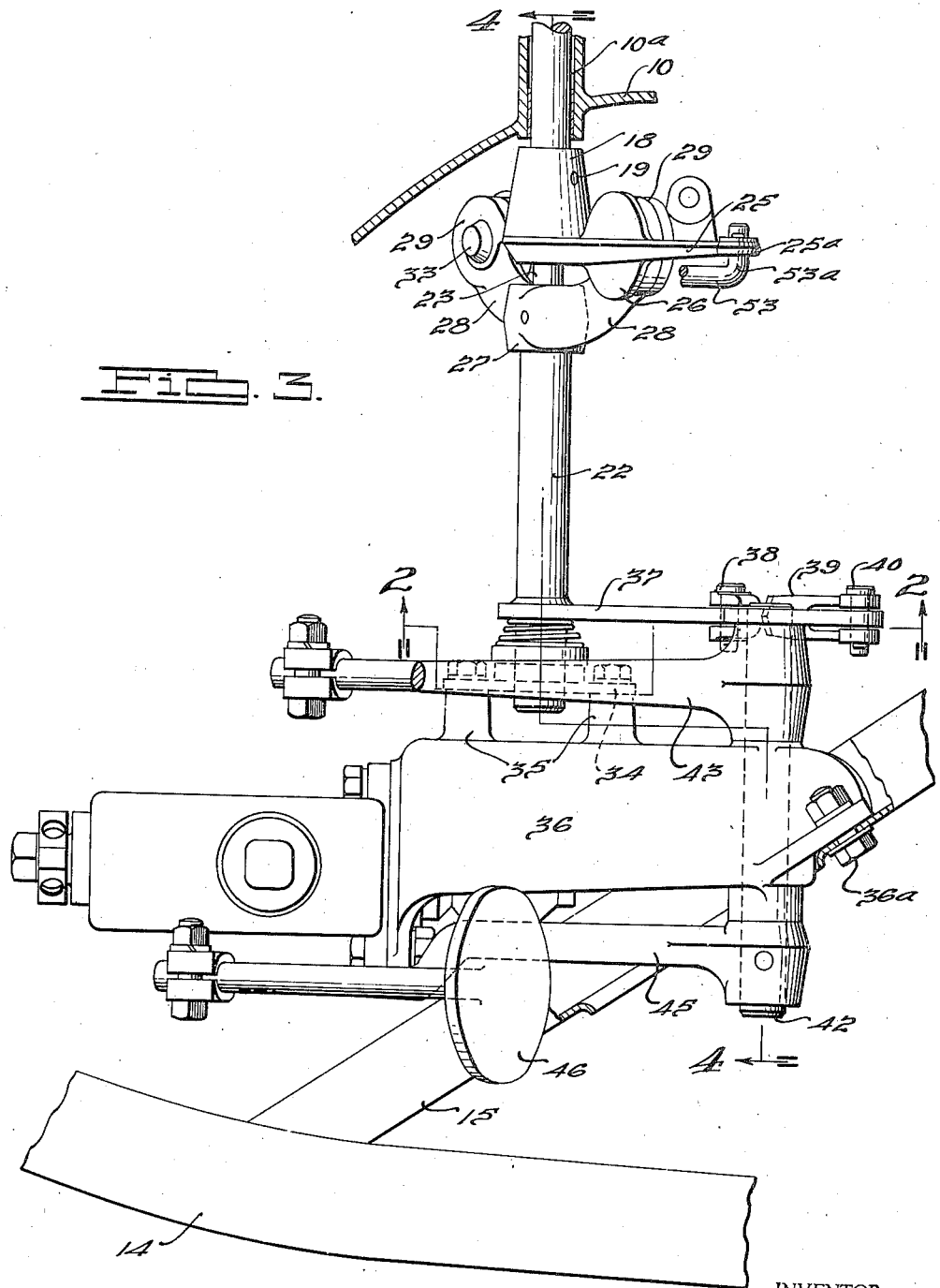

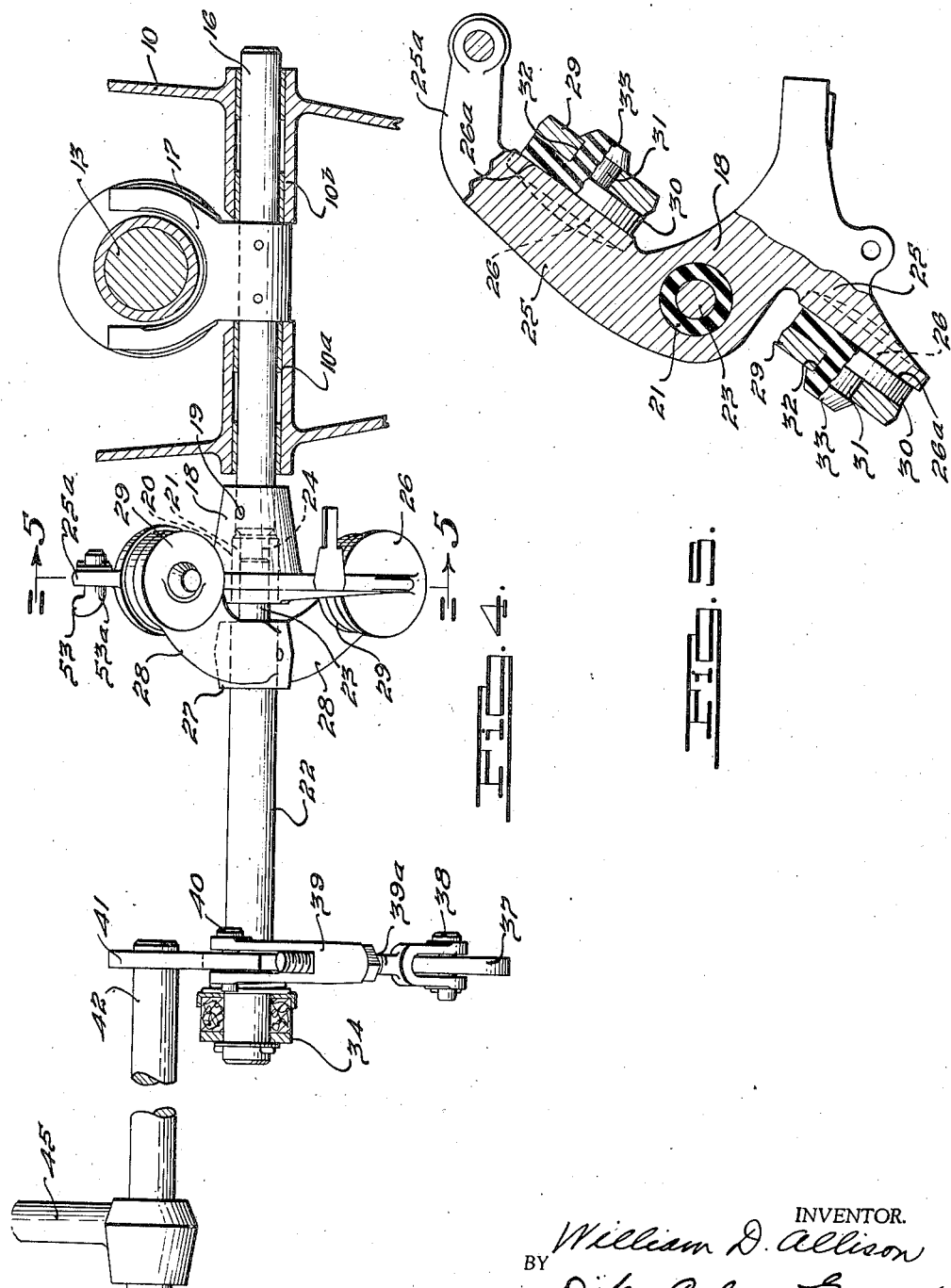

2,247,463

UNITED STATES PATENT OFFICE 2,247,463

CLUTCH SHAFT COUPLING

William D. Allison, Detroit, Mich., assignor to Hudson Motor Car Company, Detroit, Mich., a corporation of Michigan Application June 21, 1938, Serial No. 215,031

9 Claims. (Cl. 192—99)

This invention relates to mechanism for controlling the clutch of motor vehicle power units and particularly internal combustion engines which are resiliently mounted upon the vehicle chassis or frame for limited movement relatively thereto in response to engine vibrations. The invention is also useful in connection with power plants having both pedal controlled and automatically controlled clutch operating means.

The present application is a continuation-in-part of my copending application Serial No. 116,311, filed December 17, 1936.

An object of the invention is to provide improved coupling means interposed between the clutch throwout mechanism and the clutch pedal for eliminating or reducing appreciably vibrations tending to be transmitted from the power unit to the clutch pedal.

A further object of the invention is to provide an improved cushioned coupling device incorporated in the clutch control cross-shaft for damping out vibrations of the resiliently mounted engine normally transmitted to the clutch pedal.

Another object of the invention is to provide a clutch control cross-shaft composed of disconnected sections and coupling elements between the shaft sections whereby operation of the clutch may be accomplished either through the medium of the clutch pedal or an automatically actuated mechanism and the functioning of the latter may be accomplished without any accompanying movement of the foot pedal.

Other objects of this invention will appear in the following description and appended claims, reference being had to the accompanying drawings forming a part of this specification wherein like reference characters designate corresponding parts in the several views.

Fig. 1 is a fragmentary perspective view of a power unit mounted in the chassis frame of an automobile and including a resiliently mounted internal combustion engine and a clutch control shaft embodying coupling elements constructed in accordance with the present invention.

Fig. 2 is a fragmentary sectional elevation taken substantially through lines 2—2 of Fig. 3 in the direction of the arrows.

Fig. 3 is a fragmentary top plan view, partly in section.

Fig. 4 is a transverse sectional elevation taken substantially through lines 4—4 of Fig. 3 in the direction of the arrows.

Fig. 5 is a section taken substantially through lines 5—5 of Fig. 4 in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation and it is not intended to limit the invention claimed herein beyond the requirements of the prior art.

Referring to the drawings and particularly to Fig. 1, there is illustrated therein a power unit for an automotive vehicle including the cylinder block 9 of an internal combustion engine which is yieldingly supported in any suitable manner, well known in the art, on the frame cross members through the medium of resilient or rubber cushioning elements permitting a limited oscillatory movement of the power unit in response to vibrations of the engine. In Fig. 1 the flywheel and clutch housing is shown at 10 which is secured to the transmission housing shown at 11. The gear shift lever for the change speed gears is shown at 12 and the drive shaft at 13. The frame of the automobile comprises the usual longitudinal side sills 14 which are connected in rear of the power plant by means of X-frame members, one thereof being shown at 15.

As illustrated particularly in Fig. 4, the clutch control cross-shaft is, in accordance with the present invention, formed in two independent sections positioned end to end and adapted to be driven one from the other through an improved coupling mechanism as a result of which vibrations transmitted from the power plant to one of the clutch cross-shaft sections are not transmitted to any appreciable extent to the other cross-shaft section and thence to the clutch pedal. Suitably journalled in the housing 10 through the medium of suitable bearings 10a and 10b is a clutch control cross-shaft section 16 to which is pinned the forked clutch throw-out lever 17. One end of the shaft 16 projects out from the clutch housing a suitable distance and to this end of the shaft is pinned a sleeve 18 which projects a substantial distance beyond said end of the shaft, as illustrated in Fig. 4. As shown, the sleeve has a bore to receive the end of the shaft section 16 and is pinned thereto at 19. Beyond the end of the shaft the sleeve 18 has a counterbore 20 within which is inserted a bushing 21. The bushing 21 is made of suitable resilient material such as rubber or the like. Extending substantially in alignment with the shaft section 16 is a shaft section 22, and the end of this shaft adjacent the sleeve 18 is turned down to provide a pilot end 23 of a diameter to fit within the bushing 21. The length of the counterbore is such as to provide normally a space 24 between the end of the pilot 23 and the opposed end of the shaft 16 whereby endwise movement or vibration of the shaft 16 relatively to the shaft 22 is permitted because of the resiliency of the bushing 21 without directly transmitting such vibrational movements to the shaft 22.

As illustrated particularly in Fig. 5, there is preferably formed integrally, as by casting or forging, with the sleeve 18 a pair of lever or crank arms 25 which extend in opposite directions from the axis of the shaft. These arms are suitably ribbed for reinforcement and each terminates in a contact portion 26 which is preferably substantially circular in form to provide a substantially flat smooth disk-like bearing face 26a. In the illustrated embodiment the bearing faces 26a at the terminal ends of the crank arms 25 are metallic and are located at opposite sides of the shaft at substantially diametrically opposed positions at equal distances from the shaft. Pinned to the shaft section 22 in back of the pilot end 23 is a hub or sleeve member 27, and preferably formed integrally with this hub, as by casting or forging, are a pair of lever or crank arms 28. These arms curve away from the hub 27 and terminate at their outer ends in disk-like portions 29 which normally lie exactly opposite the contact or bearing faces 26a. Thus, the arms 28 secured to the shaft 22 extend to substantially diametrically opposite positions with relation to the shaft axis and the terminal members 29 thereof lie at substantially the same distances from the center of the shaft as the members 26. Mounted upon the members 29 are resilient rubber biscuits 30 which are in the form of flat circular disks lying flat against the faces of the portions 29 and having flat contact faces engageable with the corresponding contact faces 26a of the members 26. Each rubber biscuit or disk 30 is formed centrally thereof with a projecting stud or stem 31 extending through a hole 32 in the member 29 and fastened in place by the head 33.

The opposite outer end of the shaft 22 is mounted in an aperture in a bracket plate 34 bolted to a pair of bosses 35 projecting from a bracket 36 bolted at 36a to the cross-frame member 15. It will be noted that the support of the shaft 22 at 34 is relatively short, which with the normal bearing clearance permits the necessary degree of angular movement of the shaft caused by the vibratory movements of the engine. In order to prolong the life of the support as a journal, an oil saturated felt is provided adjacent to the support 34, which felt is kept in close contact with the bearing by means of a suitable spring.

Fastened to the shaft section 22 near one end thereof is a projecting arm 37, the opposite end of the arm having preferably a plurality of holes through the medium of any one of which is pivoted at 38 an adjustable link 39, the latter being of conventional two-part construction having a screw adjustment at 39a to permit the length of the link to be varied. The upper end of the link 39 is pivoted at 40 to an arm 41 fastened to a clutch pedal shaft 42. This shaft extends transversely through and has a bearing in the bracket 36. This shaft at its inner end forms a mounting for the brake operating lever 43 to the outer end of which is connected the brake pedal 44. Pinned to the outer end of the clutch pedal shaft 42 is the clutch pedal lever 45 to the outer end of which is connected the clutch pedal 46.

In accordance with one important aspect of the invention the construction of the clutch control cross-shaft mechanism is such as to permit operation of the clutch through the medium of an automatic mechanism without, however, effecting movement of the clutch pedal. This automatic mechanism may be connected directly to the shaft section 16 and, due to the coupling devices between the shaft sections, the section 16 may be rotated in one direction (to disengage the clutch) wholly independently of the shaft section 22. A suitable automatic clutch operating mechanism may take the form of a vacuum controlled mechanism. In Fig. 1 there is accordingly illustrated, by way of example, a vacuum cylinder 47 of conventional type having therein a so-called vacuum or fluid pressure operated piston (not shown). Secured to the piston and projecting through the end of the cylinder is a rod 48. The cylinder is sealed at this point around the piston rod by a flexible bellows-like rubber sealing element 49 surrounding the rod. Attached to the end of the rod is a clevis 50 between the forked ends of which is pivoted the upper end of a lever 51. The lower end of the lever is pivoted or fulcrumed at 51a to a suitable bracket fastened to the side of the engine block 9 and intermediate its ends the lever 51 is pivoted to a clevis 52 to which is adjustably connected by adjusting nuts the threaded end of a rod 53. The lower end of the rod is offset laterally at 53a and this bent end has an articulated connection in an aperture in an arm 25a projecting from the crank arm 25 which in turn, as described, is rigid with the sleeve 18 while the latter is pinned to shaft section 16.

Thus, when the clutch is operated by the vacuum mechanism it will be seen that inward movement of the piston rod 48 due to the corresponding movement of the piston in cylinder 47 will swing the lever 51 about its fulcrum 51a thereby exerting a pull on rod 53 and swinging crank arms 25 and their bearing pads 26 in a counterclockwise direction away from crank arms 28 and their bearing pads 30. Hence, the shaft 16 will be rotated to operate the clutch without effecting any rotation of shaft 22 or movement of the clutch pedal and associated parts.

Also it will be seen that, since the clutch control cross-shaft in accordance with the illustrated embodiment of the invention is a two-part construction comprising shaft sections 16 and 22 which are disconnected from each other, one is not subject directly to vibrations of the other. When the clutch is operated by the foot pedal the sections of the clutch control cross-shaft may be coupled together so that rotative or oscillatory movement of one can be transmitted to the other through the medium of the oppositely arranged pairs of crank arms 25 and 28. By reason of the terminal disk-like contact portions 26 and 30 of these arms, which are arranged in opposed relation, an effective coupling is provided by means of which rotation of shaft 22 will be transmitted to shaft 16 when the clutch pedal is depressed, while at the same time only a surface contact between the parts 26 and 30 is produced. This engagement of the rubber and metal surfaces will effectively absorb and cushion any vibratory movement of the shaft 16 when the clutch pedal is depressed and the members 26 and 30 are engaged under pressure.

I claim:

1. In a power plant for an automotive vehicle, the combination of a clutch, a clutch control cross shaft rotatively supported on said power plant and adapted to be connected to the clutch, a second shaft located in alignment with said shaft, means for supporting adjacent ends of said shafts for limited relative endwise movement while maintaining the same disconnected, a pair of oppositely projecting arms secured to the end of one shaft, a pair of oppositely projecting arms secured to the end of the other shaft, the arms of one shaft having terminal bearing portions disposed face to face with terminal bearing portions on the arms of the other shaft, and cushioning means interposed between said faces.

2. In a power plant for an automotive vehicle, a clutch housing, a clutch shaft journalled thereon, a sleeve fixed to one end of the shaft and having a bore, a second shaft having a sliding fit in said bore and disposed in alignment with the clutch shaft, cooperating outwardly projecting arms carried by adjacent ends of said shafts and bearing one against the other for transmitting rotation of one shaft to the other, a clutch pedal shaft connected to said second shaft, and a clutch pedal secured to the clutch pedal shaft.

3. A clutch control cross shaft assembly interposed between the clutch pedal and clutch of an automotive vehicle power plant, comprising a pair of disconnected cross shaft sections positioned end to end, a pair of oppositely projecting crank arms secured to each shaft section and terminating in contact faces, the contact faces of the respective crank arms of the shaft sections being arranged in overlapping relation, and means connected to one of said crank arms for imparting angular movement to one shaft section independently of the other.

4. In a motor vehicle, the combination of an engine mounted on said vehicle for limited movement, a clutch rigidly secured to said engine, a cross shaft having one end journalled in the structure of said clutch and adapted to control the same, a shaft section arranged coaxially with said cross shaft in abutting relation therewith and journalled in the structure of the vehicle, a clutch pedal mounted on the vehicle structure and operatively connected with said shaft section, a sleeve secured to the end of said cross shaft adapted to support the abutting end of said shaft section, and a resilient bushing in said sleeve between said abutting end and the sleeve.

5. In a motor vehicle, the combination of an engine mounted on said vehicle for limited movement, a clutch rigidly secured to said engine, a cross shaft having one end journalled in the structure of said clutch and adapted to control the same, a shaft section arranged coaxially with said cross shaft in abutting relation therewith and journalled in the structure of the vehicle, a clutch pedal mounted on the vehicle structure and operatively connected with said shaft section, a sleeve secured to the end of said cross shaft adapted to support the abutting end of said shaft section, a resilient bushing in said sleeve between said abutting end and the sleeve, and means resiliently connecting said sleeve with said shaft section for transmission of torque.

6. In a motor vehicle, the combination of an engine mounted on said vehicle for limited movement, a clutch rigidly secured to said engine, a cross shaft having one end journalled in the structure of said clutch and adapted to control the same, a shaft section arranged coaxially with said cross shaft in a substantially end to end relation therewith and journalled in the structure of the vehicle, means mounted on the vehicle structure and operatively connected with said shaft section for turning the same, a member secured to the end of the cross shaft adjacent to an end of said shaft section and adapted to support said end of the shaft section, and a resilient bushing in said member between said shaft section and the member.

7. In a motor vehicle, the combination of an engine mounted on said vehicle for limited movement, a clutch rigidly secured to said engine, a cross shaft having one end journalled in the structure of said clutch and adapted to control the same, a shaft section arranged coaxially with said cross shaft in a substantially end to end relation therewith and journalled in the structure of the vehicle, means mounted on the vehicle structure and operatively connected with said shaft section for turning the same, a sleeve secured to the end of the cross shaft adjacent to an end of said shaft section and adapted to support said end of the shaft section, a resilient bushing in said sleeve between said shaft section and the sleeve, and cooperating outwardly projecting arms carried by the adjacent ends of said shaft section and shaft and adapted to bear one against the other for transmission of torque.

8. In a motor vehicle, the combination of an engine mounted on said vehicle for limited movement, a clutch rigidly secured to said engine, a cross shaft having one end journalled in the structure of said clutch and adapted to control the same, a shaft section arranged coaxially with said cross shaft in substantially end to end relation therewith and journalled in the structure of the vehicle, means mounted on the vehicle structure and operatively connected with said shaft section for turning the same, a sleeve secured to an end of said cross shaft and adapted to support the adjacent end of said shaft section, and a resilient bushing in said sleeve between said end of the shaft section and the sleeve, and a pair of oppositely projecting crank arms secured to said cross shaft and said shaft section respectively and terminating in contact faces, the contact faces of the respective crank arms being arranged in overlapping relation whereby operation of the clutch may be accomplished upon angular movement of said shaft section.

9. In a motor vehicle, the combination of an engine mounted on said vehicle for limited movement, a clutch rigidly secured to said engine, a cross shaft having one end journalled in the structure of said clutch and adapted to control the same, a shaft section arranged coaxially with said cross shaft in substantially end to end relation therewith and journalled in the structure of the vehicle, means mounted on the vehicle structure and operatively connected with said shaft section for turning the same, a sleeve secured to the end of said cross shaft and adapted to support the adjacent end of said shaft section, and a resilient bushing in said sleeve between said end of the shaft section and the sleeve, a pair of oppositely projecting crank arms secured to said cross shaft and said shaft section respectively and terminating in contact faces, the contact faces of the respective crank arms being arranged in overlapping relation whereby operation of the clutch may be accomplished upon angular movement of said shaft section, and resilient bearing pads interposed between said contact faces.

WILLIAM D. ALLISON.